United States Patent [19]
Howard et al.

[11] 3,952,590
[45] Apr. 27, 1976

[54] APPARATUS FOR REDUCING AERODYNAMIC NOISE IN A WIND TUNNEL

[75] Inventors: Paul W. Howard; Luke A. Schutzenhofer, both of Huntsville, Ala.

[73] Assignee: The United States of America as represented by the Administrator of the National Aeronautics and Space Administration, Washington, D.C.

[22] Filed: Aug. 26, 1975

[21] Appl. No.: 607,969

[52] U.S. Cl. ................................................ 73/147
[51] Int. Cl.² ........................................ G01M 9/00
[58] Field of Search ............ 73/147, 205 L; 138/39

[56] References Cited
UNITED STATES PATENTS 3,017,769  1/1962  Orlin .................................. 73/147
3,027,760  4/1962  Holderer ............................. 73/147

Primary Examiner—Donald O. Woodiel
Attorney, Agent, or Firm—Wayland H. Riggins; L. D. Wofford, Jr.; John R. Manning

[57] ABSTRACT

An apparatus for reducing the background noise produced by the porous walls of the test section of a wind tunnel includes a finely meshed screen member placed over the perforations in the test section walls. The mesh wire screen attached to the interior wall provides a smoother surface for the air stream to flow against reducing the vorticies produced by the edges of the perforations in the test section walls.

4 Claims, 3 Drawing Figures

APPARATUS FOR REDUCING AERODYNAMIC NOISE IN A WIND TUNNEL

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to an apparatus for reducing aerodynamic background noise in the test section of a transonic wind tunnel. Since the development of the transonic wind tunnel during the early 1940's, an almost continued effort has been made to improve air flow quality. During the early development years, it was observed that wind tunnel blockage and reflected shock waves from the models being tested would seriously affect the determination of loads and other aerodynamic data. The wind tunnel blockage phenomenon consists of standing shock waves in the tunnel test section and problems associated with startup of the wind tunnel. The problem of reflected shock waves consists of shock waves originating at the model reflecting from the wind tunnel walls back to the model for influencing any data being acquired from the air flow around the model.

The utilization of porous walls was one technique developed to reduce the problems of wind tunnel blockage and shock wave reflections. In this technique, suction could be applied to the porous wall which aided in starting the wind tunnels and for maintaining the air flow through the test section in a uniform manner. Later, this technique was refined so as to optimize air flow conditions for all mach numbers by providing a variable porosity wall surface for the test section of the wind tunnel, with the variable porosity wall opened to a setting that would provide optimum wave cancellation for a particular transonic mach number and also eliminate the problems of blockage.

Even though the variable porosity walls have improved the flow quality in wind tunnel test sections in some manner, evidence exists which indicates that the porous wind tunnel walls also produce high background noise levels in wind tunnel test sections. For the most part, fluctuating pressure data collected from experiments conducted in transonic wind tunnels have been incorrect or in some cases completely drowned out by the high background noise levels of the wind tunnel. It has been found that the perforations or holes formed in the porous wind tunnel walls subject the air stream to the sharp edges and corners of the perforations with the walls at any porosity setting between zero and maximum and that the sharp edges of the hole create a whistling effect of the air passing thereover. The sharp edges and corners create edge tones, and shock and expansion waves that are radiated into the free stream which influence not only the fluctuating pressure measurements on the model, but also the steady state flow conditions in the wind tunnel test section. Therefore, to increase the accuracy and reliability of the aerodynamic data taken in transonic wind tunnels, it is necessary to suppress the background noise created by the porous walls.

SUMMARY OF THE INVENTION

The invention includes a fluid duct apparatus for aerodynamic testing and the like having a passage portion of substantially constant cross section, means for conveying a mass of air through said passage portion at least substantially at transonic speeds. The passage portion includes a wall member enclosing and defining said passage portion therethrough having perforations formed therein providing porosity to said wall member. Suction means operatively connected to the exterior of said wall member is provided for withdrawing fluid from said passage portion through said perforations to aid in establishing air flow in said passage portion at a desired speed. A mesh screen member is carried on an interior surface of said wall member covering said perforations for reducing background noise produced by the air flow passing over the edges of said perforations. Thus interference of the background noise with the aerodynamic measurements taken within said passage portion is minimized increasing the accuracy and reliability of the measurements.

Accordingly, it is an important object of the present invention to provide an apparatus for reducing aerodynamic noise in the test section of a transonic wind tunnel.

Still another important object of the present invention is to utilize variable porosity walls in the test section of a transonic wind tunnel to eliminate wind tunnel blockage and shock wave cancellation, while at the same time providing apparatus to suppress the background noise provided by the porous walls.

Another important object of the present invention is to provide a simple and effective apparatus for suppressing aerodynamic background noise caused by porous walls in the test section of a transonic wind tunnel that can be easily adapted to any existing transonic wind tunnel.

These and other objects and advantages of the invention will become apparent upon reference to the following specification, attendant claims, and drawing.

DESCRIPTION OF A PREFERRED EMBODIMENT

The screen wire apparatus of the present invention may be incorporated in any conventional transonic wind tunnel and since such are well known in the art, it will be unnecessary to disclose or describe a complete wind tunnel machine herein. Moreover, since the application of the present invention is similar with any conventional wind tunnels, it will be unnecessary to illustrate all of them herein, and we have accordingly chosen to illustrate the invention in connection with a fourteen-inch, square cross-section blowdown wind tunnel with a removable test section.

Figure 1:
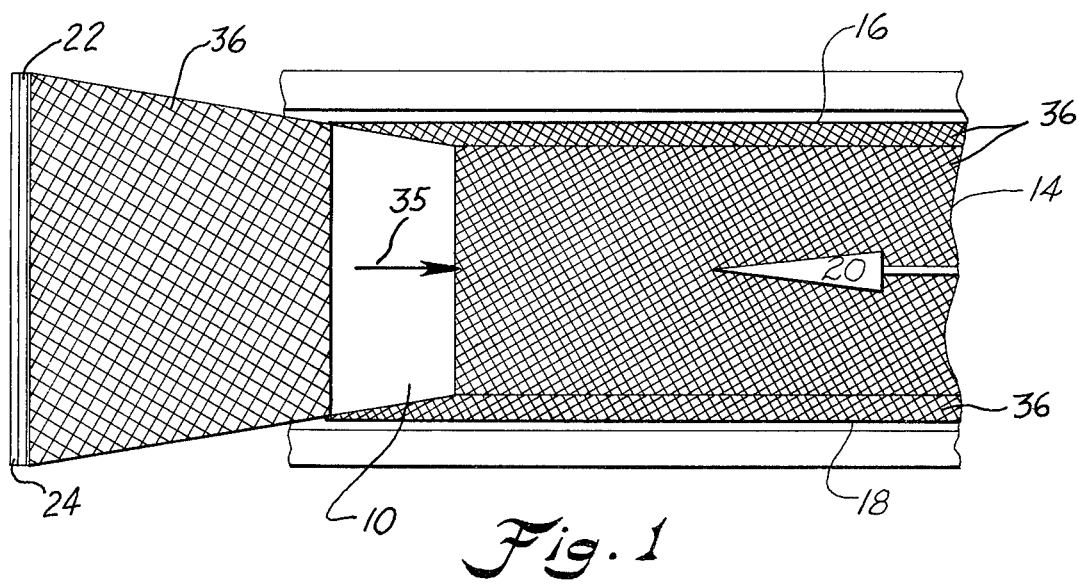
FIG. 1 is a cross-section view illustrating a test section portion of a wind tunnel constructed in accordance with the present invention.

Accordingly, FIG. 1 of the drawing shows only so much of a conventional wind tunnel as is necessary to illustrate the application thereto of the present invention.

Figure 2:
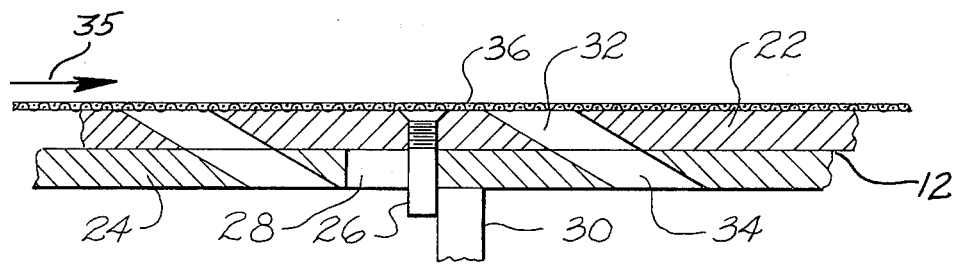
FIG. 2 is a cross-section view illustrating a porous wall member constructed in accordance with the present invention for suppressing background noise.
Figure 3:
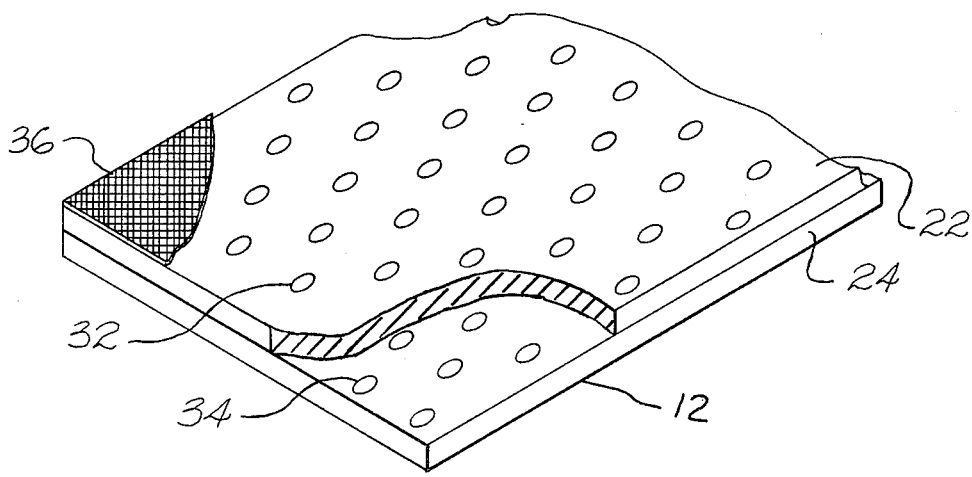
FIG. 3 is a perspective view of a test section wall member constructed in accordance with the present invention with parts of the wall member cut away to show the three layers which comprise the wall member constructed in accordance with the present invention.

A test section of a wind tunnel, is schematically illustrated at 10, is enclosed by a wall member having a pair of side wall 12 and 14, a top wall 16 and a bottom wall 18 defining a passage portion of a substantially constant cross-section chamber. Within the chamber aerodynamic measurements may be taken on various body shapes such as the cone member 20 shown in FIG. 1. The side wall 12 is a pivotable door wall providing access to the test section. Each of the wall members 12 through 18 is preferably a double wall having a cross-section as illustrated in FIG. 2 comprising a fixed interior wall member 22 and a movable exterior wall member 24. The fixed wall member 22 may be supported by any suitable means such as screw member 26 fastened thereto extending through an aperature 28 in the movable wall member. The screw member 26 can then be attached, such as by welding, to a mounting support 30 carried on the wind tunnel frame. The movable wall member 24 is attached to the wind tunnel frame in a conventional manner so that it slides longitudinally relative to the fixed wall 22.

The fixed wall member 22 has a plurality of perforations 32 formed therethrough and movable wall member 24 has a plurality of identical perforations 34 formed therethrough. When the perforations 32 and 34 are in complete alignment, as shown in FIG. 2, maximum porosity is afforded to the wall member as a unit. As the movable wall member 24 is moved to the right the alignment of the perforations 34 with respect to the perforations 32 is changed and the porosity of the wall members as a unit is decreased. The movable wall member 24 may be moved to an extreme rightmost position to completely close off the perforations 34 affording zero porosity to the wall as a unit. The variable porosity walls are used to optimize wave cancellations for transonic mach numbers and also to mitigate blockage by allowing a portion of the air stream to flow through the perforations. In a conventional wind tunnel, a source of suction is applied to the exterior of the wall members to withdraw the desired amount of air flow through the perforations.

To reduce the background noise created by the flow of air, in the direction of arrow 35, over the edges of the perforations 32, a screen member 36, which is shown expanded in FIG. 1 for clarity, is placed over the perforations on all four wall members 12 through 18. In one preferred embodiment, a woven stainless steel wire screen was utilized having a mesh of 40/inch, a wire diameter of 0.01 inch, a mesh opening of 0.015 inch, and an open area of 36 percent. The woven wire screen is preferably bonded to the test section walls using any suitable adhesive or may be attached utilizing any suitable fastening means such as screws. With the woven wire screen attached over the perforated walls of the test section, a smoother surface is provided for the air stream to flow against thereby eliminating the edge tones, shock and expansion waves, while providing enough porosity at the wall to cancel the shock waves generated by the model being tested. In addition to using stainless steel wire mesh, other suitable materials may be utilized such as fiber metal types.

The wire mesh screen member utilized in accordance with the present invention offers a smoother surface to the oncoming airflow than the perforated walls and thus dampens vortices and resonances caused by the wall perforations. This simple and inexpensive expedient virtually eliminates the tunnel background noise problem that has plagued transonic wind tunnel aerodynamic testing for many years.

While a preferred embodiment of the invention has been described using specific terms, such description is for illustrative purposes only, and it is to be understood that changes and variations may be made without departing from the spirit or scope of the following claims.

What is claimed is:

1. In a fluid duct apparatus for aerodynamic testing and the like having a passage portion of substantially constant cross section, means for conveying a mass of air through said passage portion at least substantially at sonic speeds, said passage portion comprising:
   a. a wall member enclosing and defining said passage portion therethrough having perforations formed therein providing porosity to said wall member;
   b. a mesh screen member carried on an interior surface of said wall member covering said perforations for reducing background noise produced by the air flow passing over the edges of said perforations;
   whereby interference of the background noise with the aerodynamic measurements taken within said passage portion is minimized increasing the accuracy and reliability of the measurements.

2. The apparatus of claim 1 wherein said wall member includes a double wall member comprising:
   a. a fixed interior wall member having perforations formed therein; and
   b. a movable exterior wall member carried adjacent said fixed wall member having perforations formed therein aligned with the perforations of said fixed wall member in a first position, said movable wall member being movable to vary the alignment of said perforations of said movable wall member with respect to the perforations of the fixed wall member providing variable porosity to the double wall member and thus to said passage portion.

3. The apparatus of claim 1 wherein said screen member is a finely woven mesh screen of stainless steel.

4. The apparatus as set forth in claim 3 wherein said woven mesh screen has a mesh of 40/inch, a wire diameter of 0.01 inch, a mesh opening of 0.015 inch, and an open area of 36 percent.

\* \* \* \* \*